(12) United States Patent
Katsuda et al.

(10) Patent No.: US 6,808,204 B1
(45) Date of Patent: Oct. 26, 2004

(54) HYBRID INFLATOR

(75) Inventors: Nobuyuki Katsuda, Hyogo (JP); Norimasa Hirata, Hyogo (JP); Masayuki Yamazaki, Hoygo (JP)

(73) Assignee: Daicel Chemical Industries, Ltd., Sakai (JP)

( * ) Notice: Subject to any disclaimer, the term of this patent is extended or adjusted under 35 U.S.C. 154(b) by 0 days.

(21) Appl. No.: 09/857,891

(22) PCT Filed: Sep. 29, 2000

(86) PCT No.: PCT/JP00/06787
§ 371 (c)(1),
(2), (4) Date: Jun. 13, 2001

(87) PCT Pub. No.: WO01/25058
PCT Pub. Date: Apr. 12, 2001

(30) Foreign Application Priority Data

| Oct. 1, 1999 | (JP) | 11/281509 |
| Sep. 22, 2000 | (JP) | 2000/288951 |
| Sep. 25, 2000 | (JP) | 2000/290236 |

(51) Int. Cl.$^7$ .............................................. B60R 21/28
(52) U.S. Cl. ...................................................... 280/741
(58) Field of Search ................................ 280/740, 741, 280/742, 736, 735

(56) References Cited

U.S. PATENT DOCUMENTS

| 3,758,131 A | 9/1973 | Stephenson et al. |
| 3,868,124 A | 2/1975 | Johnson |
| 4,370,181 A | * 1/1983 | Lundstrom et al. ...... 149/109.2 |
| 5,351,988 A | 10/1994 | Bishop et al. |
| 5,507,891 A | 4/1996 | Zeigler |
| 5,711,546 A | * 1/1998 | Hamilton et al. ........... 280/736 |
| 5,851,027 A | 12/1998 | DiGiacomo et al. |
| 5,882,036 A | 3/1999 | Moore et al. |
| 6,177,028 B1 | * 1/2001 | Kanda et al. ............. 252/186.2 |
| 6,474,684 B1 | * 11/2002 | Ludwig et al. ............. 280/741 |

FOREIGN PATENT DOCUMENTS

| EP | A1673809 | 9/1995 |
| EP | 0844148 A1 | 5/1998 |
| EP | A1844148 | 5/1998 |
| JP | A8282427 | 10/1996 |
| JP | A8301682 | 11/1996 |
| JP | A9183682 | 7/1997 |
| JP | A11152288 | 6/1999 |
| JP | A11157978 | 6/1999 |
| JP | A11199361 | 7/1999 |

* cited by examiner

Primary Examiner—Faye M. Fleming
(74) Attorney, Agent, or Firm—Birch, Stewart, Kolasch & Birch, LLP

(57) ABSTRACT

A hybrid inflator which is made more compact and lighter is provided. An excessive internal pressure increase at a time of activation is prevented by setting a molar ratio (A/B) between a pressurized medium (A moles) charged in a housing 102 and an amount of a gas (B moles) generated due to combustion of a gas generating agent 122 to 8/2 to 1/9.

19 Claims, 2 Drawing Sheets

HYBRID INFLATOR

This application is the national phase under 35 U.S.C. § 371 of PCT International Application No. PCT/JP00/06787 which has an International filing date of Sep. 29, 2000, which designated the United States of America and was not published in English.

TECHNICAL FIELD

The present invention relates to an inflating-type safety system of motor vehicles, and more particularly to a hybrid inflator capable of inflating an air bag rapidly and being made more compact and lighter, and an air bag apparatus using the same inflator.

PRIOR ART

With the development of an inflator for an inflating-type safety system of motor vehicles, a hybrid inflator using both a pressurized gas and a solid gas generating agent is attracting attention. A main design requirement for the hybrid inflator is that the inflator inflates an air bag by a predetermined volume in a predetermined time so that the air bag is effectively activated. Various proposals concerning a structure to meet the requirement have heretofore been made. As the prior arts, there have been known JP-A No. 8-282427, EP No. 0844148, U.S. Pat. Nos. 5,351,988, 5,882,036, 5,851,027, 3,868,124 and 3,758,131, etc.

Further, since the hybrid inflator is manufactured to be installed in the motor vehicle, the weight of the inflator, which has influence upon the weight of the motor vehicle, particularly constitutes an important design requirement. Therefore, it is required to consider such points.

However, in the conventional hybrid inflator using a pressurized gas together with a solid gas generating agent, the design requirement mentioned above can not be sufficiently satisfied in some cases. For example, in the case of the structure in which an internal pressure is increased by utilizing a heat generated due to a combustion of the solid gas generating agent and an air bag is deployed by emitting the pressurized gas, it is necessary to increase a thickness of the housing in order to increase a pressure resistance. Further, in the case that the oxygen is contained in the pressurized gas, there is a problem such that the weight is increased by the oxygen. Further, there is a hybrid inflator structured such that the oxygen is not contained in the pressurized gas by utilizing the gas generating agent in perchlorate system. In this case, however, there is a problem such that fine particles which are harmful to a passenger are generated due to the combustion of the gas generating agent. Further, the conventionally employed solid gas generating agent is mainly made of a gun type such as RDX.

DISCLOSURE OF INVENTION

An object of the present invention is to provide a hybrid inflator being made more compact and lighter without deteriorating a function as an inflator and guaranteeing a high safety, and an air bag apparatus using the same.

The present invention provides a hybrid inflator for an inflating-type safety system of vehicles provided with an air bag, which comprises an inflator housing, a gas generator installed in the inflator housing, an ignition unit chamber connected to the gas generator, wherein the interior of the inflator housing is filled with a pressurized medium containing an inert gas and no oxygen, the gas generator has one or two or more gas generating chambers including a gas generating agent, and a molar ratio (A/B) between an amount (A moles) of the pressurized medium and an amount (B moles) of gas generated due to combustion of the gas generating agent is between 8/2 and 1/9.

It is possible to reduce a charged amount of the pressurized medium by adjusting the molar ratio between the amount of the pressurized medium charged inside the hybrid inflator and the amount of the gas generated due to the combustion of the gas generating agent. Accordingly, even in the case of reducing a capacity of the housing (that is, reducing a length and/or a width (a diameter) of the housing), the charged pressure of the pressurized medium (the internal pressure of the housing) does not have to be increased, and it can be maintained under the same pressure as that before reducing the capacity.

The ratio A/B is preferably set to 8/2 to 3/7. In this case, in the hybrid inflator according to the present invention, the weight ratio (a/b) between the weight (a) of the pressurized medium and the weight (b) of the gas generating means is set to 0.1 to 0.7, and preferably set to 0.5 to 5.

In the above hybrid inflator, desirably, the pressurized medium does not contain oxygen for achieving, more effectively, the operation and effect mentioned above. And further, it is desirable to use the gas generating agent containing a fuel and an oxidizing agent. Still, it is preferable to use the gas generating agent containing a fuel, an oxidizing agent, and a slug-forming agent, in addition to the operation and effect mentioned above, generation of the fine particles, which are harmful to the passenger, can be suppressed.

Further, the above hybrid inflator can be structured such that a pressure index at combustion of the gas generating agent defined by the following formula $rb = \alpha P^n$ (in the formula, rb: burning rate, $\alpha$: coefficient, P: pressure, n: pressure index) is less than 0.8. The pressure index (n) is preferably set to 0.1 to 0.8, and more preferably to 0.1 to 0.7.

In this case, the pressure index n is obtained in accordance with two formulas, $rb_1 = \alpha P_1^n$ and $rb_2 = \alpha P_2^n$, after measuring the burning rate rb1 in a tank having a pressure $P_1$ (70 kg/cm$^2$) and measuring the burning rate rb2 within a tank having a pressure $P_2$ (100 kg/cm$^2$).

By setting the pressure index (n) to be less than 0.8 in this manner, the burning rate at the initial stage of the combustion of the gas generating agent can be prevented from rapidly increasing, and therefore, an increase of the housing internal pressure is small. Accordingly, even in the case of reducing the thickness of the housing, a sufficient pressure resistance can be maintained. Further, since the combustion of the gas generating agent is stably performed due to the small increase of the housing internal pressure (that is, the change of the internal pressure is small), a combustion residue of the gas generating agent is never generated.

Further, the present invention provides a hybrid inflator for an inflating-type safety system of vehicles provided with an air bag, which comprises an inflator housing, a gas generator installed in the inflator housing, an ignition unit chamber connected to the gas generator, wherein the interior of the inflator housing is filled with a pressurized medium containing an inert gas, the gas generator has one or two or more gas generating chambers including a gas generating agent, the pressurized medium contains no oxygen, and the gas generating agent contains a fuel and an oxidizing agent.

Further, the present invention provides, as still another way of solving the problem, a hybrid inflator for an inflating-type safety system of vehicles provided with an air bag, which comprises an inflator housing., a gas generator installed in the inflator housing, an ignition unit chamber connected to the gas generator, wherein the interior of the inflator housing is filled with a pressurized medium containing an inert gas, the gas generator has one or two or more gas generating chambers including a gas generating agent, the pressurized medium contains no oxygen, and a pressure index at the combustion of the gas generating agent defined by the following formula rb=αP$^n$ (in the formula, rb: burning rate, α: coefficient, P: pressure, n: pressure index) is burnt is less than 0.8.

The pressurized medium used in the hybrid inflator according to the present invention comprises an inert gas and substantially contains no oxygen. As the inert gas, for example, argon and helium can be used, and, additionally, nitrogen can be used together. Accordingly, the inert gas in the present invention contains nitrogen. Argon works to promote a thermal expansion of the pressurized medium, and a leakage of the pressurized medium can be easily detected if the helium is contained, so that, preferably, defective inflators can be prevented from being distributed. The charged pressure of the pressurized medium is set to 10,000 to 70,000 kPa and preferably 20,000 to 60,000 kPa.

Further, the present invention provides a hybrid inflator for an inflating-type safety system of vehicles provided with an air bag, which comprises an inflator housing, a gas generator installed in the inflator housing, an ignition unit chamber connected to the gas generator, wherein the interior of the inflator housing is filled with a pressurized medium, the gas generator has one or two or more gas generating chambers including a gas generating agent, and a molar ratio (A/B) between an amount (A moles) of the pressurized medium and an amount (B moles) of gas generated due to a combustion of the gas generating agent is between 8/2 and 1/9.

In this invention, the ratio A/B is preferably set to 8/2 to 3/7, the weight ratio (a/b) between the weight (a) of the pressurized medium and the weight (b) of the gas generating agent is set to 0.1 to 7, and preferably set to 0.5 to 5. Further, preferably, the pressurized medium does not contain the oxygen, however, in order to promote the combustion of the gas generating agent, oxygen can be contained in the pressurized medium. An amount of oxygen to be added is preferably set to be not more than 10 moles %, and more preferably set to be not more than 5 moles %.

Further, in the above hybrid inflator, a pressure index at combustion of the gas generating agent defined by the following formula rb=αP$^n$ (in the formula, rb: burning rate, (α: coefficient, P: pressure, n: pressure index) is less than 0.8. The pressure index (n) is preferably set to 0.1 to 0.8, and more preferably to 0.1 to 0.7.

Further, in the hybrid inflator mentioned above, the charged pressure of the pressurized medium is set to 10,000 to 70,000 kPa, and more preferably 20,000 to 60,000 kPa.

In the above hybrid inflator according to the present invention, as the gas generating agent, obtained by mixing compositions containing a fuel and an oxidizing agent, or alternatively a fuel, an oxidizing agent and a slug-forming agent with a bonding agent if required and forming in a desired shape, can be used.

In the hybrid inflator according to the present invention, it is preferable to use the gas generating agent having a perforated cylindrical shape with one or two or more through holes or non-through holes. By using the gas generating agent having such a perforated cylindrical shape, the combustion of the gas generating agent can be promoted, and thereby, an operating performance of the hybrid inflator can be improved.

In the gas generating agent formed in the perforated cylindrical shape, an outer diameter (R), an inner diameter (d) and a length (L) can be suitably set in a range applicable to the hybrid inflator. In the case of an agent formed in a single-perforated cylindrical shape having one through hole, it is preferable that the outer diameter is not more than 6 mm and a ratio (L/W) of a length with respect to a thickness (W) (R−d/2) is not less than 1. In the case of an agent formed in a porous cylindrical shape having at least two through holes, it is preferable that an outer diameter is not more than 60 mm and a ratio (L/W) of a length with respect to a width (W) (in the case that a plurality of holes are uniformly arranged, a distance between the holes, and in the case that they are not uniformly arranged, the average of the respective distances) distances) is not less than 1. Further, in the case of an agent having one or two or more non-through holes, it is preferable that the outer diameter is not more than 60 mm, a ratio (L/W) of the length with respect to the thickness (W) (having the same definition as that of the above agent formed in the porous cylindrical shape) is not less than 1, and a ratio (W'/W) between a thickness W' of the non-through hole portion (a distance between the bottom portion of the non-through hole and the bottom portion of the cylindrical agent) and the thickness (W) is set to 0.5 to 2.

In the gas generating agent, the gas generated due to the combustion thereof serves for expanding and developing the air bag together with the pressurized medium. Particularly, in the present invention, an amount of mist discharged from the inflator can be widely reduced by using the gas generating agent containing the slug-forming agent.

It is preferable that the gas generating agent contains a non-azide organic compound except nitramine compounds as a fuel. However, there can be mentioned propellant compounds, as a composition containing the nitramine compounds, disclosed in the specification of U.S. Pat. No. 5,507,891 and indicated in the claims. An example thereof can include a compound containing cyclotrimethylene trinitramine (RDX) and cyclotetramethylene tetraanitramine (HMX). Further, in addition, there can be mentioned the propellant disclosed in JP-A No. 8-282427 and indicated in the claims, for example, a secondary explosive and a binder system described in claim 32. As the secondary explosive, the RDX, HMX, PETN, TAGN or the like described in claim 34 in the same Laid-open publication can be mentioned, and as the binder system, a composition containing the bonding agent such as CA, CAB, CAP, EC, PVA or the like described in claims 37 and 38 can be mentioned.

As the fuel containing the non-azide organic compound except the nitramine compounds, the following a nitrogen-containing compound can be used. Examples thereof can be one or a mixture of at least two selected from triazole derivatives, tetrazole derivatives, and guanidine derivatives, azodicarbonamide derivatives, hydrazine derivatives. Specific examples thereof can include 5-oxo-1,2,4-triazole, tetrazole, 5-aminotetrazole, 5,5-bi-1H-tetrazole, guanidine, nitroguanidine, cyanoguanidine, triaminoguanidine nitrate, guanidine nitrate, guanidine carbonate, biuret, azodicarbonamide, carbohydrazide, carbohydrazide nitrate complex, oxalic acid dihydrazide, and hydrazine nitrate complex.

Preferably, the fuel can be one or two or more selected from guanidine derivative such as nitroguanidine (NQ), guanidine nitrate salt (GN), guanidine carbonate, amino nitroguanidine, amino guanidine nitrite, amino guanidine carbonate, diamino guanidine nitrite, diamino guanidine carbonate, and triamino guanidine nitrite, however, it is not limited to these of course.

As the oxidizing agent, one or at least two selected from a group comprising strontium nitrate, potassium nitrate, ammonium nitrate, potassium perchlorate, copper oxide, ferrous oxide, and a basic copper nitrate are preferably used.

A preferable amount of the oxidizing agent is 10 to 80 parts by weight, and more preferably, 20 to 50 parts by weight with respect to 100 parts by weight of the fuel.

As the slug-forming agent, one or at least two selected from a group comprising acid clay, talc, bentonite, diatomaceous earth, kaolin, silica, alumina, sodium silicate, silicon nitride, silicon carbide, hydrotalsite, and a mixture thereof are preferably used.

A preferable amount of the slug-forming agent is 0 to 50 parts by weight, and more preferably, 1 to 10 parts by weight with respect to 100 parts by weight of the fuel.

As the bonding agent, one or at least two selected from a group comprising sodium salt of sodium carboxymethyl cellulose, hydroxyethyl cellulose, starch, polyvinyl alcohol, guar gum, microcrystal cellulose, polyacrylamide, and calcium stearate are preferably used.

A preferable amount of the bonding agent is 0 to 30 parts by weight, and more preferably, 3 to 10 parts by weight with respect to 100 parts by weight of the fuel.

Further, the present invention is characterized by that a gun type gas generating agent having a pressure index (n) not less than 0.8, for example, RDX or the like is not used, but instead, the above gas generating agent having a pressure index (n) of less than 0.8 is used.

Further, in the hybrid inflator according to the present invention, the inflator housing can be formed of high strength steels, and in this case, it is possible to use the high strength steels having a tensile strength not less than 60 kg/mm$^2$, preferably 80 to 105 kg/mm$^2$.

As mentioned above, since a pressure resistance can be improved by forming the inflator housing with the high strength steels, a thickness of the housing can be made thinner so as to reduce the capacity.

The present invention can be applied to a gas generator having a single gas generating chamber including a gas generating agent (single type), a gas generator having two gas generating chambers (dual type) or a gas generator having three or more gas generating chambers. An arrangement of two or more gas generating chambers is not particularly limited. For example, in the case of a gas generator having two gas generating chambers, the structure can be made such that two gas generating chambers are arranged in series and adjacently in the longitudinal direction, or the two chambers can be arranged in series and apart from each other in the longitudinal direction, or the two chambers can be arranged in parallel and adjacently in the width-direction, or the two chambers are arranged in parallel and apart from each other in the width-direction. The arrangement of the combustion chambers in parallel in the width-direction includes the arrangement such that the two combustion chambers are concentrically arranged and one gas generating chamber is defined outside the other gas generating chamber, and the arrangement such that two gas generating chambers, having a widthwise semicircular cross sectional shape, are arranged in the width-direction.

In the hybrid inflator as mentioned above, the structure can be made such that the gas generating agent is kept under the normal pressure atmosphere. It is preferable to keep the gas generating agent not under the pressurized atmosphere but under the normal pressure atmosphere because the gas generating agent can be hardly deteriorated due to the pressure in a long period of time. In the case of being deteriorated due to the pressure, the gas generating agent may be easily broken at combustion in some cases.

In the present invention as mentioned above, the "gas generator" has a gas generating function such that a high temperature combustion gas is generated due to a combustion of the gas generating agent in the gas generating chamber to flow the high temperature combustion gas into the inflator housing. And, the hybrid inflator includes the gas generator inside the inflator housing, the "inflator" has a function such that the pressurized medium existing inside the inflator housing but outside the gas generator is made flow out to the external by means of the action of the high-temperature combustion gas flowing out of the gas generator to inflate a material to be inflated such as an air bag or the like. Further, the word "hybrid" means using in combination with the high-temperature combustion gas generated due to the combustion of the gas generating agent and the pressurized medium.

Further, the present invention provides an air bag apparatus comprising an activation signal outputting unit including an impact sensor and a control unit, and a module case in which the hybrid inflator and the air bag are stored.

The hybrid inflator according to the present invention adjusts a molar ratio between an amount of pressurized medium and an amount of gas generated due to the combustion of the gas generating agent, and further adjusts a composition of the pressurized medium and the gas generating agent and/or improves a pressure resistance by using high strength steels, thereby making the inflator more compact and lighter than the conventional inflator.

PREFERRED EMBODIMENT OF THE PRESENT INVENTION

Figure 1:
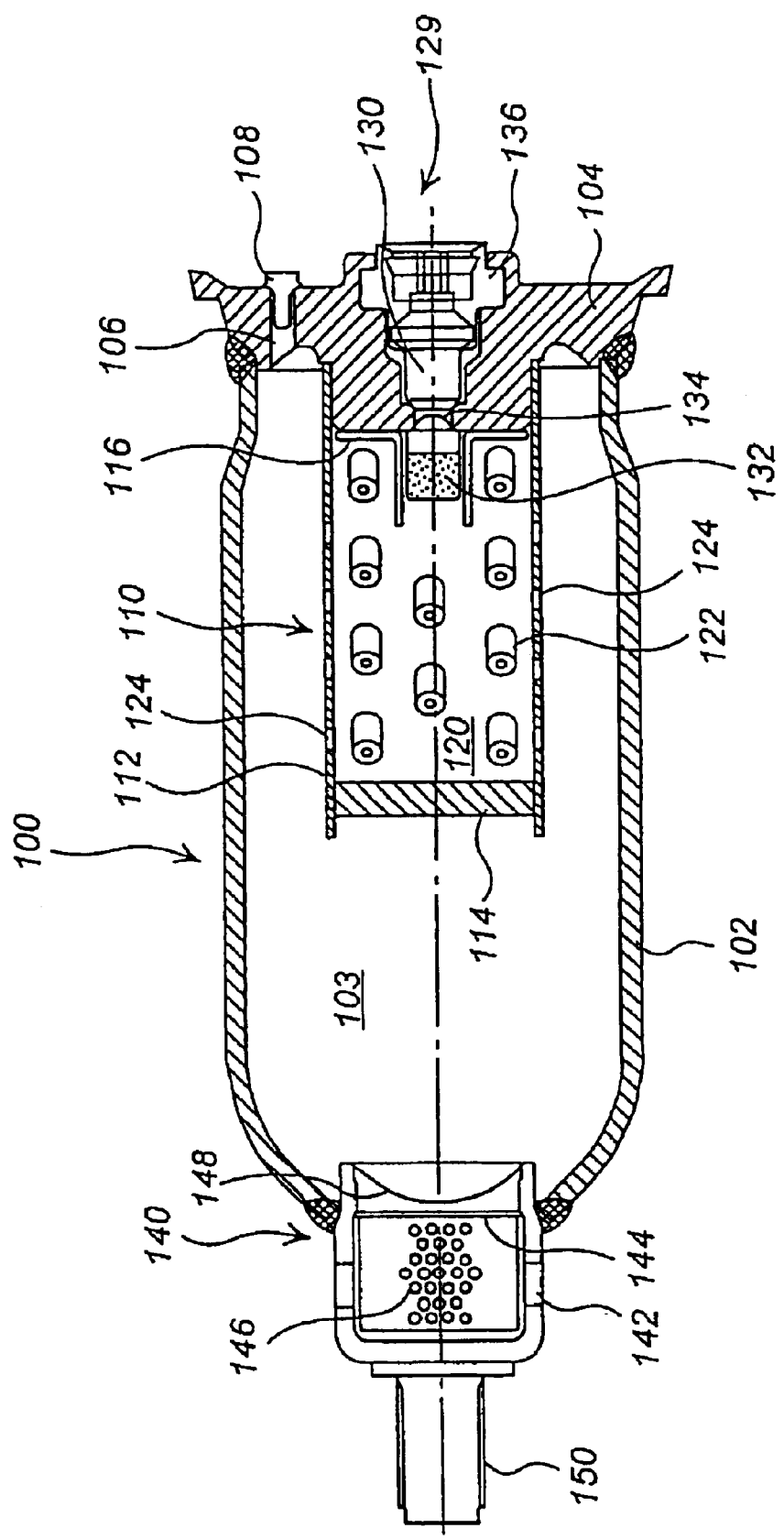
FIG. 1 is a vertical cross sectional view showing one embodiment of a hybrid inflator according to the present invention.

A description will be given in detail below of the present invention with reference to the accompanying drawings showing one embodiment according to the present invention. FIG. 1 is a vertical cross sectional view of a hybrid inflator 100 having a single gas generating chamber in its longitudinal direction thereof.

An inflator housing 102 is composed of a cylindrical container and is formed by high strength steels. A pressurized medium of an inert gas (Ar, Ne, and N$_2$) containing no oxygen is charged in an inner space 103 of the inflator housing 102 under a desired pressure. The pressurized medium is normally charged from a small hole 106 formed in a boss 104 which is connected to one end side of the inflator housing 102, and the small hole is closed by a seal pin 108 after charging the pressurized medium.

A gas generator 110 has a single gas generating chamber 120 defined by a cylindrical gas generator housing 112, a partition wall 114 and a partition wall 116 which also functions for adjusting an amount of agents, and a gas generating agent 122 comprising desired amounts of a fuel and an oxidizing agent is charged inside the gas generating chamber 120. A desired number of communicating holes 124 are formed on the housing 112, and a filter/screen may be provided, if required, inside the gas generating chamber 120 on the communication holes 124. Since the pressurized medium flows into the gas generating chamber 120 through the communication holes 124, the inside of the gas generating chamber 120 is kept at the same pressure as that of the inner space 103 of the inflator housing 102.

An ignition unit 129 is connected to the gas generator 110 in one end of the inflator housing 102, the ignition unit 129 includes an igniter 130 and a booster (a transfer charge) 132 charged in a booster cup to be ignited and burnt upon activation of the igniter 130, and a rupturable disk 134 is provided between the igniter 130 and the booster 132. Reference numeral 136 denotes an initiator collar for attaching the igniter to the boss 104.

A diffuser 140 is connected to the other end of the inflator housing 102, and the diffuser 140 has a plurality of diffuser ports 142 for feeding the pressurized medium to the air bag and diffuser screens 144 and 146 for removing fine particles. The diffuser 140 is provided with a main rupturable disk 148 on the inside of the inflator and a stud bolt 150 which is fixed on the outer surface side by welding to connect to the air bag module.

In the hybrid inflator 100 shown in FIG. 1, a molar ratio (A/B) between an amount of the pressurized medium (A moles) and an amount of the gas generated due to the combustion of the gas generating agent 122 (B moles) is set to 8/2 to 1/9, and further, a pressure index (n) is set to be less than 0.8. Further, a weight ratio (a/b) between a weight (a) of the pressurized medium and a weight (b) of the gas generating agent is set to 0.1 to 7.

Accordingly, when the gas generating agent 122 is burnt upon the activation of the igniter 130 and the ignition of the booster 132, an excessive increase of the internal pressure can be prevented. Further, the gas generated due to the combustion of the gas generating agent 122 flows into the inner space 103 through the communicating hole 124, increases the internal pressure together with the pressurized medium, and breaks the main rupturable disk 148. Thereafter, the pressurized medium and the generated gas are injected from the diffuser port 142 and applied so as to inflate and develop the air bag.

Next, a description will be given of a hybrid inflator 200 shown in FIG. 2. Since the hybrid inflator 200 has the same structure and the same operation as those of the hybrid inflator 100 shown in FIG. 1 except having a second gas generating chamber 220 in addition to the first gas generating chamber 120 corresponding to the gas generating chamber 120 in the hybrid inflator 100 shown in FIG. 1, and also having a first igniter 130 and a second igniter 230 respectively connected thereto, the same reference numerals are used to indicate the same elements as those shown in FIG. 1, and a description thereof will be omitted.

The second gas generating chamber 220 is defined by the cylindrical gas generator housing 112, the partition wall 116 and the boss 104, and a second igniter 230 is connected via a second rupturable disk 234. In this case, reference numeral 222 denotes a second gas generating agent, reference numeral 224 denotes a communicating hole, reference numeral 122 denotes a first gas generating agent, and reference numeral 134 denotes a first rupturable disk.

In the hybrid inflator according to the above embodiment, the structure can be made such that the gas generating agent is not kept in the pressurized medium but in the normal pressure atmosphere. An example of such a hybrid inflator can be one in which a diffuser is arranged between a space where the pressurized medium exists (this space is called as a "pressurized medium charged chamber") and the gas generating chamber, and the pressurized medium charged chamber and the diffuser are completely sectioned by the partition wall and the rupturable disk, to maintain the inside of the pressurized medium charged chamber at a pressurized atmosphere and maintain the inside of the gas generating chamber at a normal pressure atmosphere. In this hybrid inflator, when the rupturable disk is broken due to the combustion of the gas generating agent in the gas generating chamber, the pressurized medium in the pressurized medium charging chamber is discharged from the diffuser through the broken rupturable disk, and thereby inflating an air bag.

The air bag apparatus according to the present invention is provided with an activating signal outputting unit comprising an impact sensor and a control unit, and a module case within which the hybrid inflator and the air bag are accommodated. For example, the hybrid inflator 100 shown in FIG. 1 is connected to the activating signal outputting unit (the impact sensor and the control unit) in the igniter 130 side, and is connected and attached to the module case to which the air bag is mounted, by screwing a stud bolt 150.

The hybrid inflator according to the present invention can be suitably modified in a normal manner by those skilled in the art with respect to the other constituting elements than the elements mentioned above. Accordingly, the means for breaking the main rupturable disk 148 can be modified to other means such as known mechanical breaking means, for example, a structure using a sharp-shaped projectile, and electrical breaking means, for example, a structure using an igniter for a rupturable disk, in addition to the means utilizing a gas pressure.

EXAMPLES

A description will be given in more detail below with regard to the present invention on the basis of examples. However, the present invention is not limited to these. In this case, the gas generating agent used in the following examples was formed in a cylindrical shape with a single hole and having an outer diameter of 5.4 mm, an inner diameter of 0.7 mm, and the length of 5 mm.

Example 1

The hybrid inflator 100 in an aspect shown in FIG. 1 was manufactured. Details were as follows.

The inflator housing 102 was produced by using high strength steel (a tensile strength of 90 kg/mm$^2$). The pressurized medium was 2.6 moles (100 g) of an argon and helium mixed gas (Ar:He=96:4 (molar ratio)) (internal pressure of 32000 kPa), and the gas generating agent was 40 g (corresponding to 1.0 moles of the generated gas) of a composition comprising nitroguanidine, strontium nitrate, carboxymethyl cellulose, and Japanese acid clay (34:50:9:7), at A/B=7.2/2.8. A weight ratio (a/b) between the pressurized medium and the gas generating agent was 2.5. Accordingly, 3.6 moles of gas could be totally utilized at the activation, and the total weight of the pressurized medium and the gas generating agent before the activation was 140 g. In this case, the pressure index (n) of the gas generating agent was 0.6.

The hybrid inflator 100 constituted by the structure mentioned above had the diameter of 59 mm, the length of 156 mm (a length except the stud bolt 150 and the length of the stud bolt 150 was 20 mm). The thickness of the inflator housing 102 was 2.5 mm, and the total weight was 1,100 g. As a result of activating such a hybrid inflator 100, the internal pressure was 44,100 kPa.

Comparative Example 1

The hybrid inflator 100 in an aspect shown in FIG. 1 was manufactured. Details were as follows.

The inflator housing 102 was produced by using a normal steel (a tensile strength is 40 kg/mm$^2$). The pressurized medium was 3.6 moles (140 g) of an argon and helium mixed gas (O$^2$:Ar:He=20:76:4 (molar ratio)) (the internal pressure was 32,000 kPa), and the gas generating agent was 8 g (corresponding to 0.39 moles of the generated gas) of a composition comprising RDX and polyacrylic ester elastomer, at A/B=9.2/1. A weight ratio (a/b) between the pressurized medium and the gas generating agent was 17.5. The pressurized medium and the generated gas of the gas generating agent reacted with each other at the time of activation, thereby totally becoming 3.78 moles. The gas generating agent could generate heat sufficient to utilize all of 3.78 moles of gas for inflating the air bag. Accordingly, the total weight of the pressurized medium and the gas generating agent became 147 g. In this case, the pressure index (n) of the gas generating agent was 1.0.

In the hybrid inflator 100 constituted by the above structure, a thickness of the inflator housing was set to 3.3 mm in order to secure an actual pressure tightness, and thereby, a diameter became 60.6 mm. Further, since the pressurized medium was charged a lot, in order to obtain the same pressure as that of Example 1, the length thereof was 178.7 mm (a length except the stud bolt 150 which length was 20 mm), and the total weight of the hybrid inflator was 1,680 g. As a result of activating the hybrid inflator 100, the internal pressure was 58,800 kPa.

Example 2

The hybrid inflator 100 having the same structure as that of the example 1 was manufactured. In this case, the internal capacity was set to 0.16 L and the capacity of the gas generator storing the gas generating agent was adjusted to store the amount of the used gas generating agent. The other constituting elements were as follows.

Pressurized medium: 1.6 moles (62 g) of mixed gas of argon and helium (Ar:He=96:4 (molar ratio)) (the internal pressure 32,000 kPa)

Gas generating agent: 80 g (the generated gas of 2.0 moles) of the same agent as that of the Example 1

A/B: 1.6/2.0

A/b: 62/80=0.775

Total gas amount at a time of activating: 3.6 moles

As a result of activating the hybrid inflator, the internal pressure was 68,000 kPa.

Example 3

The hybrid inflator was manufactured in the same manner as that of the example 2 except that the gas generator was composed of a pressure resisting container and the gas generating chamber in which the gas generating agent had been stored was set to the normal pressure. In this case, in order to keep the gas generating chamber at the normal pressure, the rupturable disk was provided between the gas generating chamber and the inflator housing. As a result of activating such a hybrid inflator, substantially the same result as that of the example 2 could be obtained.

Example 4

Figure 2:
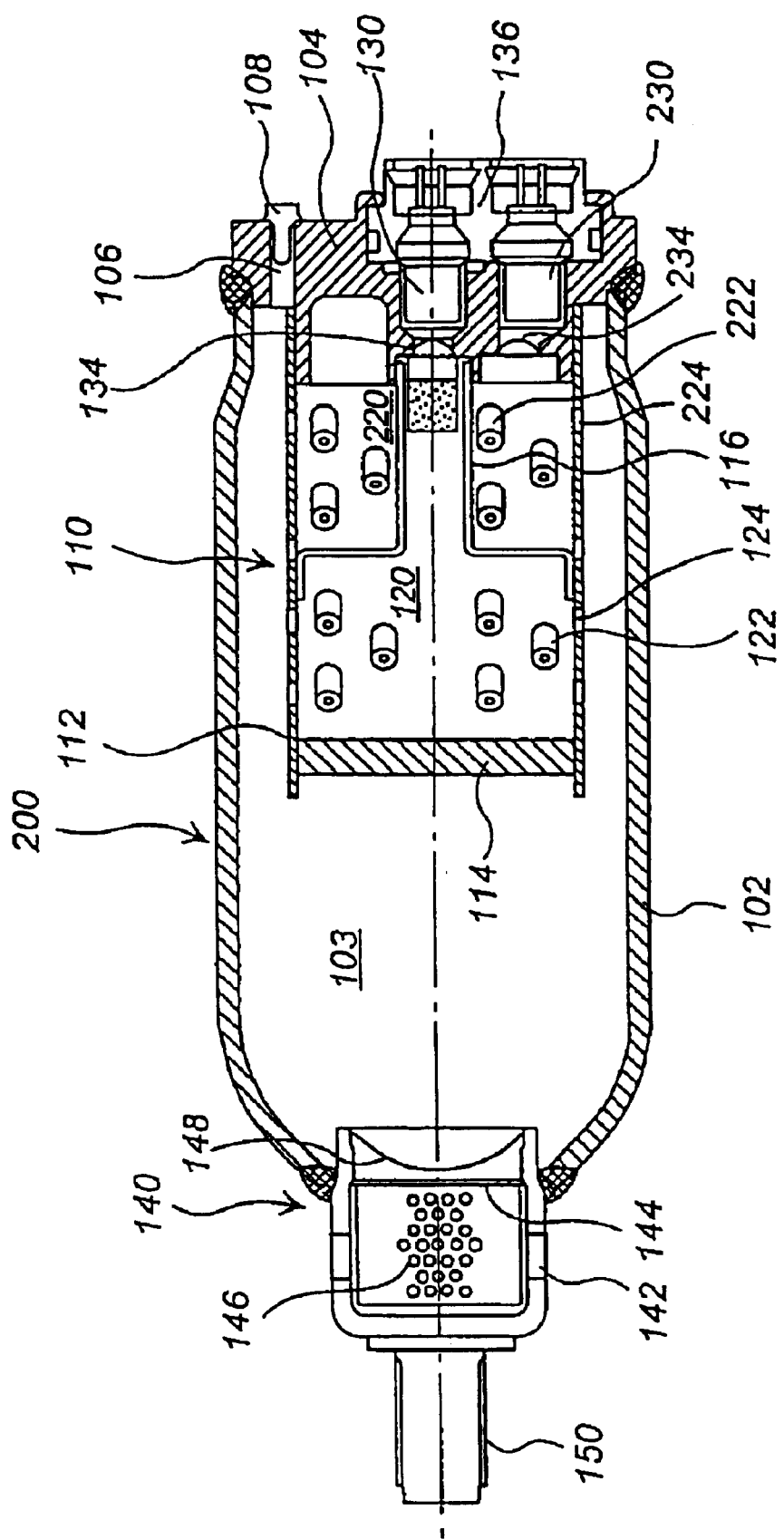
FIG. 2 is a vertical cross sectional view showing another embodiment of a hybrid inflator according to the present invention.

A dual-type hybrid inflator 200 shown in FIG. 2 was manufactured. Details were as follows.

The inflator housing 102 was produced by using high strength steel (a tensile strength is 90 kg/mm$^2$). The pressurized medium was 2.6 moles (100 g) of an argon and helium mixed gas (Ar:He=96:4 (molar ratio)) (internal pressure is 32,000 kPa), and the gas generating agent was respectively 20 g of a composition comprising nitroguanidine, strontium nitrate, carboxymethyl cellulose and Japanese acid clay (34:50:9:7), at A/B=7.2/2.8, for the first gas generating chamber and the second gas generating chamber (total 40 g corresponded to 1.0 moles of the generated gas). A weight ratio (a/b) between the pressurized medium and the gas generating agent was 2.5. Accordingly, 3.6 moles of gas could be totally utilized at a time of activating, and the total weight of the pressurized medium and the gas generating agent before the activation was 140 g. In this case, the pressure index (n) of the gas generating agent was 0.6.

The hybrid inflator 200 constituted by the above structure had the diameter of 59 mm, the length of 156 mm (a length except the stud bolt 150 which length is 20 mm). And the thickness of the inflator housing 102 was 2.5 mm, and the total weight was 1,200 g. As a result of activating the hybrid inflator 200 by a simultaneous ignition of the first and second igniters, the internal pressure became 48,000 kPa.

Example 5

In the example 1, the hybrid inflator is manufactured in, the same manner as that of Example 1, except that the pressurized medium was the mixed gas of argon, oxygen and helium (Ar:O$^2$:He=93:3:4 (molar ratio)). As a result of activating the hybrid inflator, the same result as that of the example 1 could be obtained except the matter that partly generated CO and H$_2$ were converted into CO$_2$ and H$_2$O.

What is claimed is:

1. A hybrid inflator for an inflating-type safety system of vehicles provided with an air bag, comprising:
    an inflator housing containing pressurized medium therein, and having a gas exit opening closed by a rupturable disk and provided in a vicinity of a first end portion of the inflator housing;
    a gas generator installed in the inflator housing and attached to a second end portion of the inflator housing opposing said first end portion with respect to a longitudinal direction of the inflator housing, said gas generator having at least one gas generating chamber and a plurality of ports formed only along a longitudinally axial direction of the gas generator in a circumferential wall thereof extending along the longitudinally axial direction to establish a fluid communication between the gas generating chamber and an interior of the inflator housing;
    gas generating agent provided inside the gas generating chamber, the gas generating agent being a mixture of at least a fuel, an oxidizing agent, and a slug-forming agent, for generating a predetermined amount (B) of combustion gas by combustion thereof, a molar ratio (A/B) between an amount (A moles) of the pressurized medium and the amount (B moles) of a gas generated due to combustion of the gas generating agent is between 8/2 and 1/9; and
    an ignition unit connected to the gas generator and adapted to ignite the gas generating agent.

2. A hybrid inflator according to claim 1, wherein the ratio A/B is 8/2 to 3/7.

3. A hybrid inflator according to claim 1, wherein the fuel is guanidine derivatives.

4. A hybrid inflator according to claim 1, wherein the fuel is a non-azide organic compound except the nitramine compounds.

5. A hybrid inflator according to claim 1, wherein a pressure index of the gas generating agent is less than 0.8.

6. A hybrid inflator according to claim 1, wherein a weight ratio (a/b) between a weight (a) of the pressurized medium and a weight (b) of the gas generating agent is 0.1 to 7.

7. A hybrid inflator according to claim 1, wherein the inflator housing is made of high strength steel.

8. A hybrid inflator according to claim 7, wherein the high strength steels has a tensile strength of being not less than 60 kg/mm2.

9. A hybrid inflator according to claim 1, wherein the gas generating agent is kept under a normal pressure atmosphere.

10. A hybrid inflator according to claim 1, wherein the gas generating agent is formed in a perforated cylindrical shape.

11. A hybrid inflator for an inflating-type safety system of vehicles provided with an air bag, comprising:
   an inflator housing containing a pressurized medium therein that includes an inert gas and no oxygen, said inflator housing having a gas exit opening closed by a rupturable disk and provided in a vicinity of a first end portion of the inflator housing;
   a gas generator installed in the inflator housing and attached to a second end portion of the inflator housing opposing said first end portion with respect to a longitudinal direction of the inflator housing, said gas generator having at least one gas generating chamber and a plurality of ports formed only along a longitudinally axial direction of the gas generator in a circumferential wall thereof extending along the longitudinally axial direction to establish a fluid communication between the gas generating chamber and an interior of the inflator housing;
   a gas generating agent provided in the gas generating chamber, the gas generating agent being a mixture of at least a fuel, an oxidizing agent, and a slug-forming agent, a molar ratio (A/B) between an amount (A moles) of the pressurized medium and an amount (B moles) of a gas generated due to combustion of the gas generating agent being between 8/2 and 1/9; and
   an ignition unit connected to the gas generator and adapted to ignite the gas generating agent.

12. A hybrid inflator according to claim 11, wherein the ratio A/B is 8/2 to 3/7.

13. A hybrid inflator according to claim 11, wherein the fuel is guanidine derivative.

14. A hybrid inflator according to claim 11, wherein the fuel is a non-azide organic compound except the nitramine compounds.

15. A hybrid inflator according to claim 11, wherein a pressure index of the gas generating agent is less than 0.8.

16. A hybrid inflator according to claim 11, wherein a weight ratio (a/b) between a weight (a) of the pressurized medium and a weight (b) of the gas generating agent is 0.1 to 7.

17. A hybrid inflator for an inflating-type safety system of vehicles provided with an air bag, comprising:
   an inflator housing containing a pressurized medium including an inert gas therein and having a gas exit opening closed by a rupturable disk and provided in a vicinity of a first end portion of the inflator housing, the pressurized medium containing no oxygen;
   a gas generating agent including a fuel, an oxidizing agent, and a slug-forming agent;
   a gas generator installed in the inflator housing and attached to a second end portion of the inflator housing opposing said first end portion with respect to a longitudinal direction of the inflator housing, said gas generator having at least one gas generating chamber that contains the gas generating agent and having a plurality of ports formed only along a longitudinally axial direction of the gas generator in a circumferential wall thereof extending along the longitudinally axial direction to establish a fluid communication between the gas generating chamber and an interior of the inflator housing; and
   an ignition means chamber connected to the gas generator and including an ignition unit adapted to ignite the gas generating agent.

18. A hybrid inflator for an inflating-type safety system of vehicles provided with an air bag, comprising:
   an inflator housing containing a pressurized medium including an inert gas and no oxygen, said inflator having a gas exit opening closed by a rupturable disk and provided in a vicinity of a first end portion of the inflator housing:
   a gas generating agent, comprising a fuel, an oxidizing agent, and a slug-forming agent, said gas generating agent having a pressure index of less than 0.8;
   a gas generator installed in the inflator housing and attached to a second end portion of the inflator housing opposing said first end portion with respect to a longitudinal direction of the inflator housing, said gas generator having at least one gas generating chamber for storing a gas generating agent and having a plurality of ports formed only along a longitudinally axial direction of the gas generator in a circumferential wall thereof extending along the longitudinally axial direction to establish a fluid communication between the gas generating chamber and an interior of the inflator housing: and
   an ignition means changer connected to the gas generator and including an ignition unit adapted to ignite the gas generating agent.

19. An air bag apparatus, comprising:
   an activating signal outputting unit that includes an impact sensor for detecting an impact and a control unit, and
   a module case containing an air bag and a hybrid inflator, said hybrid inflator including,
      an inflator housing containing pressurized medium therein and having a gas exit opening closed by a rupturable disk and provided in a vicinity of a first end portion of the inflator housing,
      a gas generator installed in the inflator housing and attached to a second end portion of the inflator housing opposing said first end portion with respect to a longitudinal direction of the inflator housing, said gas generator having at least one gas generating chamber and having a plurality of ports formed only along a longitudinally axial direction of the gas generator in a circumferential wall thereof extending along the longitudinally axial direction to establish a fluid communication between the gas generating chamber and an interior of the inflator housing;
      a gas generating agent provided in the gas generating chamber, the gas generating agent being a mixture of at least a fuel, an oxidizing agent, and a slug-forming agent, for generating a predetermined amount (B) of combustion gas by combustion thereof, a molar ratio (A/B) between an amount (A moles) of the pressurized medium and the amount (B moles) of a gas generated due to combustion of the gas generating agent is between 8/2 and 1/9, and
      an ignition unit connected to the gas generator and adapted to ignite the gas generating agent.

* * * * *